(12) United States Patent
Iliopoulos et al.

(10) Patent No.: US 10,452,686 B2
(45) Date of Patent: Oct. 22, 2019

(54) SYSTEM AND METHOD FOR MEMORY SYNCHRONIZATION OF A MULTI-CORE SYSTEM

(71) Applicant: HUAWEI TECHNOLOGIES CO., LTD., Shenzhen, Guangdong (CN)

(72) Inventors: Antonios Iliopoulos, Munich (DE); Shay Goikhman, Hod Hasharon (IL); Eliezer Levy, Hod Hasharon (IL)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/669,547

(22) Filed: Aug. 4, 2017

(65) Prior Publication Data

US 2017/0337256 A1    Nov. 23, 2017

Related U.S. Application Data

(63) Continuation of application No. PCT/EP2015/067784, filed on Aug. 3, 2015.

(30) Foreign Application Priority Data

Feb. 4, 2015  (EP) ..................................... 15153769

(51) Int. Cl.
*G06F 12/00* (2006.01)
*G06F 13/00* (2006.01)
(Continued)

(52) U.S. Cl.
CPC ........ *G06F 16/283* (2019.01); *G06F 12/1027* (2013.01); *G06F 16/2315* (2019.01);
(Continued)

(58) Field of Classification Search
CPC ....................... G06F 12/1027; G06F 2212/682
(Continued)

(56) References Cited

U.S. PATENT DOCUMENTS 5,497,480 A    3/1996  Hayes et al.
8,176,282 B2   5/2012  Bouvier et al.
(Continued)

FOREIGN PATENT DOCUMENTS

CN    1489059 A    4/2004
CN    1728113 A    2/2006
(Continued)

OTHER PUBLICATIONS

Carlos Villavieja et al., "DiDi: Mitigating the Performance Impact of TLB Shootdowns Using a Shared TLB Directory" 2011 International Conference on Parallel Architectures and Compilation Techniques, 2011, pp. 340-349. XP032083342.
(Continued)

*Primary Examiner* — Edward J Dudek, Jr.
*Assistant Examiner* — Sidney Li
(74) *Attorney, Agent, or Firm* — James Harrison

(57) ABSTRACT

A system for memory synchronization of a multi-core system is provided, the system comprising: an assigning module which is configured to assign at least one memory partition to at least one core of the multi-core system; a mapping module which is configured to provide information for translation lookaside buffer shootdown for the multi-core system leveraged by sending an interrupt to the at least one core of the multi-core system, if a page table entry associated with the memory partition assigned to the at least one core is modified; and an interface module which is configured to provide an interface to the assigning module from user-space.

12 Claims, 4 Drawing Sheets

(51) Int. Cl.
  *G06F 13/28*     (2006.01)
  *G06F 16/28*     (2019.01)
  *G06F 16/27*     (2019.01)
  *G06F 16/23*     (2019.01)
  *G06F 12/1027*   (2016.01)
  *G06F 12/02*     (2006.01)

(52) U.S. Cl.
  CPC .......... *G06F 16/27* (2019.01); *G06F 12/0284* (2013.01); *G06F 2212/682* (2013.01)

(58) Field of Classification Search
  USPC ........................................................ 711/133
  See application file for complete search history.

(56) References Cited

U.S. PATENT DOCUMENTS

| | | | |
|---|---|---|---|
| 2004/0073743 | A1 | 4/2004 | Arimilli et al. |
| 2005/0228964 | A1 | 10/2005 | Sechrest et al. |
| 2006/0026359 | A1* | 2/2006 | Ross ............... G06F 12/1027 711/133 |
| 2008/0270739 | A1* | 10/2008 | Hamilton ........... G06F 12/1036 711/206 |
| 2009/0100435 | A1 | 4/2009 | Papaefstathiou et al. |
| 2010/0235580 | A1* | 9/2010 | Bouvier ............... G06F 12/084 711/129 |
| 2012/0284463 | A1 | 11/2012 | Srinivasan et al. |
| 2013/0031333 | A1 | 1/2013 | Sankaran et al. |
| 2013/0073513 | A1 | 3/2013 | Kemper et al. |
| 2013/0235580 | A1 | 9/2013 | Smith |
| 2013/0339595 | A1 | 12/2013 | Kumar et al. |
| 2014/0114906 | A1* | 4/2014 | Hegde .............. G06F 17/30557 707/602 |
| 2017/0277639 | A1* | 9/2017 | Awad ................ G06F 12/1036 |

FOREIGN PATENT DOCUMENTS

| | | |
|---|---|---|
| CN | 102346714 A | 2/2012 |
| CN | 104021344 A | 9/2014 |
| JP | H02101552 A | 4/1990 |
| JP | H05314009 A | 11/1993 |
| JP | H06282492 A | 10/1994 |
| JP | H0816477 A | 1/1996 |
| RU | 2348067 C2 | 2/2009 |
| RU | 2481618 C2 | 5/2013 |

OTHER PUBLICATIONS

Alfons Kemper et al., "HyPer: A hybrid OLTP&OLAP main memory database system based on virtual memory snapshots," ICDE Conference 2011, pp. 195-206.

Romanescu, B.F. et al., "UNified Instruction/Translation/Data (UNITD) Coherence: One protocol to rule them all," IEEE, 2009. total 12 pages.

B. Gerofi et al., "Partially Separated Page Tables for Efficient Operating System Assisted Hierarchical Memory Management on Heterogeneous Architectures," 2013 13th IEEE/ACM International Symposium on Cluster, Cloud, and Grid Computing, 2013, pp. 360-368.

Austin T. Clements et al., "RadixVM: Scalable address spaces for multithreaded applications," Eurosys'13, Apr. 15-17, 2013, Prague, Czech Republic, total 14 pages.

Andrew Baumann et al., "The multikernel: A new OS architecture for scalable multicore systems," SOSP'09, Oct. 11-14, 2009, Big Sky, Montana, total 15 pages.

Robert Kallman et al., "H-store: A high-performance, distributed main memory transaction processing system," VLDB '08, Aug. 24-30, 2008, Auckland, NZ, total 4 pages.

* cited by examiner

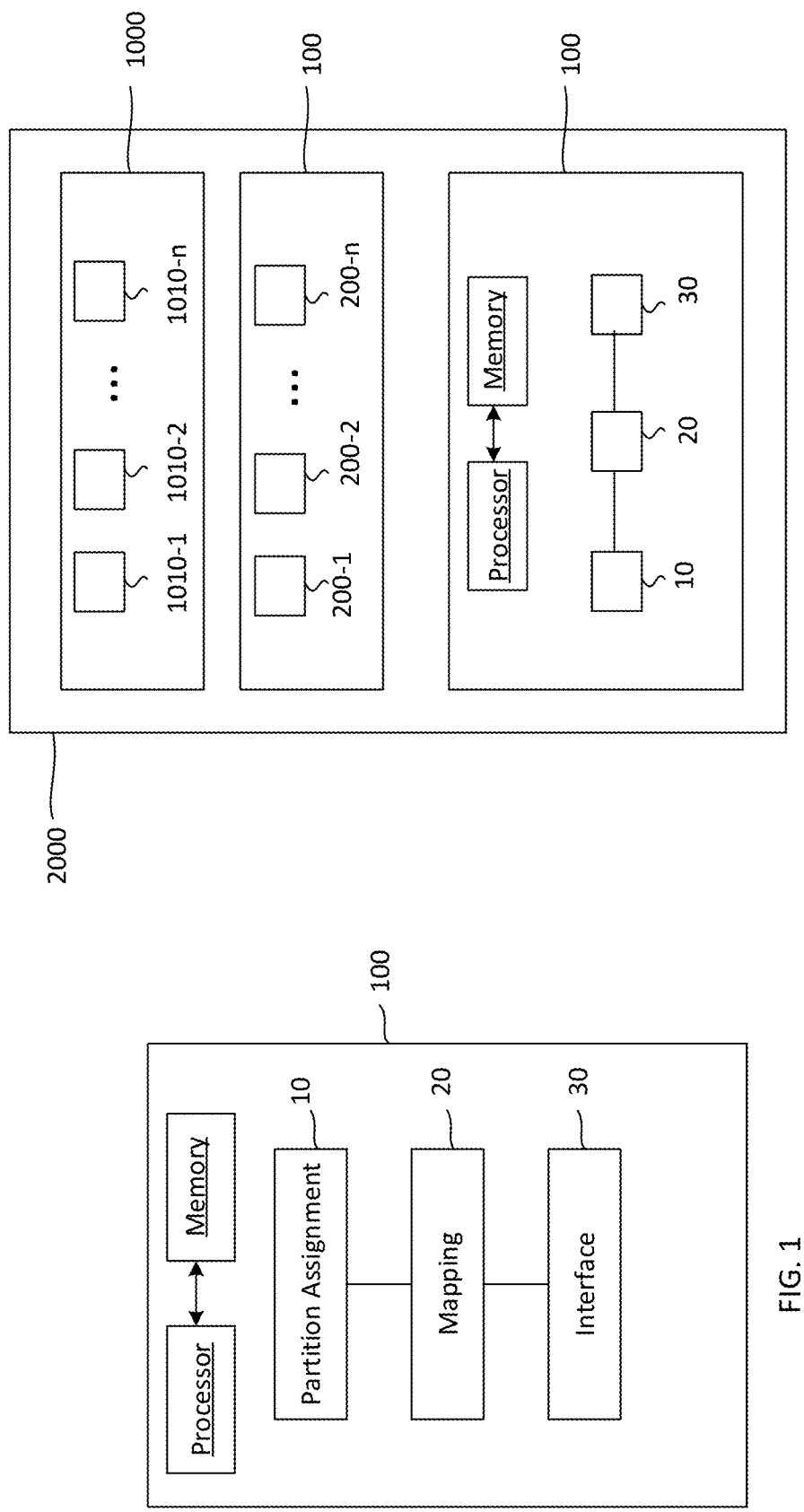

SYSTEM AND METHOD FOR MEMORY SYNCHRONIZATION OF A MULTI-CORE SYSTEM

CROSS-REFERENCE TO RELATED APPLICATIONS

This application is a continuation of International Application No. PCT/EP2015/067784, filed on Aug. 3, 2015, which claims priority to European Patent Application No. EP15153769.3, filed on Feb. 4, 2015. The disclosures of the aforementioned applications are hereby incorporated by reference in their entireties.

TECHNICAL FIELD

The present disclosure relates to the field of scaling hybrid Online-Transaction-Processing/Online Analytical Processing in memory databases by binding partitions to cores. In particular the present application relates to a system for memory synchronization of a multi-core system.

BACKGROUND

Traditionally database systems that need to serve both Online-Transaction-Processing, OLTP, and, Online Analytical Processing, OLAP, workloads are decoupled, where one system serves the OLTP transactional load in real-time, and where another separate system is serving the OLAP analytical workload operating on a previously imported dataset. This setup has a number of drawbacks: it requires more physical resources, maintenance overhead, and most importantly it precludes doing OLAP analytics in near-real-time on top of the OLTP database, as it necessitates batched export and import of the data from the OLTP to the OLAP system.

The idea of providing in-memory snapshots for analytical queries by leveraging the Memory Management Unit MMU is partially solving the problem by enabling a single database to serve both OLTP and OLAP workloads, but it is severely limited by scalability bottlenecks that are related to the necessary interactions of the operating system kernel with the underlying hardware platform, and in specific the responsibility of the operating system to maintain consistency of the TLB cache entries, especially in the case of a multicore platform that exposes a large number of computing units (CPU cores). US 2013/0073513 A1 describes a method of maintaining a hybrid OLTP and OLAP database, the method comprising: executing one or more OLTP transactions; creating a virtual memory snapshot; and executing one or more OLAP queries using the virtual memory snapshot. The therein described method further comprises replicating a virtual memory page on which a data object is stored in response to an update to the data object, whereby the updated data object is accessible for OLTP transactions, while the non-updated data object remains accessible for OLAP queries. Accordingly, the therein described hybrid system can handle both OLTP and OLAP simultaneously by using hardware-assisted replication mechanisms to maintain consistent snapshots of the transactional data.

SUMMARY AND DESCRIPTION

It is the object of the disclosure to teach a way to improve memory synchronization for a multi-core system, in particular to provide an improved technique for scaling hybrid OLTP/OLAP in-memory databases that leverage the MMU for hardware-assisted virtual memory snapshotting, i.e. making a snapshot, or versioning of data.

Features of the various embodiments are recited in the independent claims. Further aspects may be found the dependent claims, the description of embodiments and the figures.

The disclosure directly addresses the problem of scalability of hybrid OLTP/OLAP in-memory databases that leverage the MMU for hardware-assisted virtual memory snapshotting or versioning of data.

According to a first aspect, a system for memory synchronization of a multi-core system is provided, the system comprising: a processor configured to operate as an assigning module to assign at least one memory partition to at least one core of the multi-core system; and to operate as a mapping module to provide information for translation lookaside buffer (TLB) shootdown for the multi-core system leveraged by sending an interrupt to the at least one core of the multi-core system, if a page table entry associated with the memory partition assigned to the at least one core is modified; and an interface module which is configured to provide an interface to the assigning module from userspace.

The present disclosure addresses the issue of scalability by exposing an interface from the operating system kernel to the database, through which the database can inform the kernel regarding "binding" of memory regions or memory partitions to particular central processing unit, CPU, cores. The operating system kernel, based on the information provided previously from the database, selectively invalidates particular translation lookaside buffer, TLB, entries of specific cores (TLB shootdown) instead of "broadcasting" TLB shootdowns to all of the cores that share the database address space by means of threads.

A further advantage is that the present disclosure advantageously discloses a system to enable any MMU-based snapshot scheme to scale on modern multicore machines, by exposing implicit control of the TLB shootdown procedure to the database system.

For example, the database system, by controlling the placement of its transactional (OLTP) threads, is aware of which CPU cores/threads operate on which parts of the memory (database partitions). By passing this information to the kernel, the database implicitly controls the TLB shootdown procedure, by restricting the TLB shootdown, inter-processor interrupts, IPIs, are restricted to a set of selected cores, for each partition. This reliefs the system from the excessive overheads related to performing very costly IPI-based TLB shootdowns towards all available cores that share the address space, during page-fault handling time, and enables high scalability of the system using the MMU-based snapshotting scheme.

According to one aspect, the application or database is able to maintain the binding of the OLTP threads to the memory partitions, and to provide this information to the kernel for the purposes of having a more selective and directed TLB-shootdown for copy-on-write page-faults, serving as a consistent snapshotting mechanism for hybrid OLTP/OLAP in-memory database systems.

Without this information provided from the database to the operating system kernel, the kernel has to broadcast TLB shootdown IPIs to all the cores that share an address space and that incurs a very high cost, or alternatively the operating system kernel needs to be redesigned in order to track down the usage of pages for all the available system cores which incurs high implementation costs as well as runtime costs.

The present disclosure advantageously provides scalability in MMU-based snapshots in the context of in-memory database systems.

The basic concept of this disclosure is enabling high scalability for hybrid OLTP/OLAP database systems which use MMU-based snapshot mechanism. This is achieved by means of exposing TLB shootdown control from the operating system kernel to user-space, where it can be influenced by the database system.

Under a MMU-based snapshot scheme (performing lazy, copy-on-write page sharing), the bulk of the overhead comes from the TLB shootdown IPIs that are performed during handling of the copy-on-write, CoW, page fault.

In particular, the present disclosure advantageously provides that by enabling the database to control which cores should receive TLB shootdown IPIs for different parts of the address space, scalability of the MMU-based method is achieved serving as a snapshotting mechanism for in-memory hybrid OLTP/OLAP database systems.

In particular, the present disclosure advantageously utilizes the knowledge or information that the database system has that can be leveraged by the operating system, in order to significantly reduce the TLB shootdown costs that are inherent to the nature of the MMU-based snapshotting mechanism.

In particular, the present disclosure advantageously provides a method in which the database system assigns bindings between memory and/or partitions to hardware cores for the purposes of TLB shootdown during CoW, and ensures that threads performing transactions (OLTP) operate on their assigned partitions.

In particular, the present disclosure advantageously provides a way to convey a binding of a hardware core to a data partition for the purposes of TLB shootdown during CoW, from the database to the operating system kernel, by means of new system calls.

In particular, the present disclosure advantageously provides an operating system kernel mechanism, which at the point of TLB shootdowns required during CoW page-fault handling, consults the previously database-provided binding and therefore issues TLB shootdown IPIs in a selective manner, directed towards only the specific cores that are bound to the particular memory where the faulting page belongs to.

As an advantage, the OLTP performance is increased (both in terms of lower-latency response time and throughput), by reducing the processing time of the threads that perform transactions.

As a further advantage, the system spends significantly less time in-kernel when CoW page-faults occur. Further, the MMU/hardware-assisted snapshotting mechanism (CoW) scales with an increasing number of processing cores.

The term "copy-on-write" as used by the present disclosure may describe an optimization strategy used in computer programming. Copy-on-write stems from the understanding that when multiple separate tasks use initially identical copies of some information (i.e., data stored in computer memory), treating it as local data that they may occasionally need to modify, then it is not necessary to immediately create separate copies of that information for each task The term "memory synchronization" as used by the present disclosure may describe a process used in multi-core systems computers that performs synchronization mechanisms for memory synchronization in multi-core systems.

The term "memory management unit (MMU)", sometimes called paged memory management unit (PMMU), as used by the present disclosure, may describe a computer hardware unit having all memory references passed through itself, primarily performing the translation of virtual memory addresses to physical addresses.

The term "snapshot" or "snapshotting" as used by the present disclosure may describe a snapshot, which is the state of a system at a particular point in time. The term may be used as an analogy to that in photography. The term can refer to an actual copy of the state of a system or to a capability provided by certain systems.

The term "inter-processor interrupt" as used by the present disclosure may describe a special type of interrupt by which one processor may interrupt another processor in a multiprocessor system if the interrupting processor requires action from the other processor.

In a first possible implementation form of the system according to the first aspect, the mapping module is configured to provide the information for translation lookaside buffer shootdown during a copy-on-write page sharing of the at least one memory partition. This advantageously provides means to enable any MMU-based snapshot scheme to scale on multi-core machines.

In a second possible implementation form of the system according to the first aspect as such or according to the first implementation form of the first aspect, the interface module is configured to provide the interface to the assigning module to the user-space by a set of system calls for controlling a binding of the at least one memory partition to the at least one core. This advantageously provides that the database or an application is aware of which CPU cores and/or threads operate on which parts of the memory (database partitions).

In a third possible implementation form of the system according to the first aspect as such or according to the any of the preceding implementation forms of the first aspect, the interface module is configured to adapt the translation lookaside buffer shootdown by information as received by using the set of system calls. This advantageously provides that a more selective and directed TLB-shootdown is performed.

According to a second aspect, the disclosure relates to a database, comprising a multi-core system with at least one core; a memory system with at least one memory partition; and a system for memory synchronization of the multi-core system, the system comprising: an assigning module which is configured to assign at least one memory partition to at least one core of the multi-core system; a mapping module which is configured to provide information for translation lookaside buffer shootdown for the multi-core system by sending an interrupt to the at least one core of the multi-core system, if a page table entry associated with the memory partition assigned to the at least one core is modified; and an interface module which is configured to provide an interface to the assigning module from user-space.

In a first possible implementation form of the database according to the second aspect, the database is a hybrid online transactional processing and online analytical processing database. This advantageously provides to perform OLTP transactions and OLAP analytics on the same in-memory data.

In a second possible implementation form of the of the database according to the second aspect or according to the any of the preceding implementation forms of the second aspect, the database is configured to perform online transaction processing by ensuring that at least one online transactional processing thread operates on one or more of the at least one memory partition. This advantageously provides an efficient multi processing approach and improves the efficiency to allocate tasks between them.

In a third possible implementation form of the of the database according to the second aspect or according to the any of the preceding implementation forms of the second aspect, the database is enabled to provide a controlled dispatching of the translation lookaside buffer shootdown by using a data structure indicating which of the at least one core is bound to which of the at least one memory partition. This further improves the execution of multiple concurrent processes of the multi-core system.

In a fourth possible implementation form of the database according to the second aspect or according to the any of the preceding implementation forms of the second aspect, the interface module is configured to communicate a binding of the at least one memory partition to the at least one core. This advantageously provides that the database or an application is aware of which CPU cores/threads operate on which parts of the memory (database partitions).

In a fifth possible implementation form of the database according to the fourth possible implementation form of the second aspect, the interface module is configured to adapt the translation lookaside buffer shootdown by information as received by using the set of system calls. This advantageously provides that a more selective and directed TLB-shootdown is performed.

According to a third aspect, the disclosure relates to a method for memory synchronization of a multi-core system, the method comprising: assigning at least one memory partition to at least one core of the multi-core system using an assigning module; providing a translation lookaside buffer shootdown for the multi-core system using a mapping module by sending an interrupt to the at least one core of the multi-core system, if a page table entry associated with the memory partition assigned to the at least one core is modified; and providing an interface to the assigning module to a user-space using an interface module.

In a first possible implementation form of the method according to the third aspect, the step of providing the translation lookaside buffer shootdown is performed during a copy-on-write page sharing of the at least one memory partition. This advantageously provides means to enable any MMU-based snapshot scheme to scale on multi-core machines.

In a second possible implementation form of the method according to the third aspect or according to the first possible implementation form of the method according to the third aspect, the step of providing the translation lookaside buffer shootdown is performed by a set of system calls for controlling a binding of the at least one memory partition to the at least one core. This advantageously provides that the database or an application is aware of which CPU cores and/or threads operate on which parts of the memory (database partitions).

In a third possible implementation form of the method according to the third aspect as such or according to the any of the preceding implementation forms of the third aspect, the translation lookaside buffer shootdown is adapted by information as received by using the set of system calls. This advantageously provides that a more selective and directed TLB-shootdown is performed.

According to a fifth aspect, the disclosure relates to a computer program comprising a program code for performing the method according the any of the preceding implementation forms of the third aspect, when the computer program runs on a computer.

The methods, systems and devices described herein may be implemented as software in a Digital Signal Processor, DSP, in a micro-controller or in any other side-processor or as hardware circuit within an application specific integrated circuit, ASIC or in a field-programmable gate array which is an integrated circuit designed to be configured by a customer or a designer after manufacturing—hence "field-programmable".

The present disclosure can be implemented in digital electronic circuitry, or in computer hardware, firmware, software, or in combinations thereof, e.g. in available hardware of conventional mobile devices or in new hardware dedicated for processing the methods described herein.

These and other aspects of the present disclosure will become apparent from and be elucidated with reference to the embodiments described hereinafter. A more complete appreciation of the present disclosure and the attendant advantages thereof will be more clearly understood with reference to the following schematic drawings.

BRIEF DESCRIPTION OF THE DRAWINGS

Further embodiments of the present disclosure will be described with respect to the following figures, in which:

FIG. 1 shows a schematic diagram of a system for memory synchronization of a multi-core system according to one embodiment of the present disclosure;

FIG. 2 shows a database system for memory synchronization of a multi-core system according to an embodiment of the disclosure;

DETAILED DESCRIPTION OF EMBODIMENTS OF THE DISCLOSURE

Figure 3:
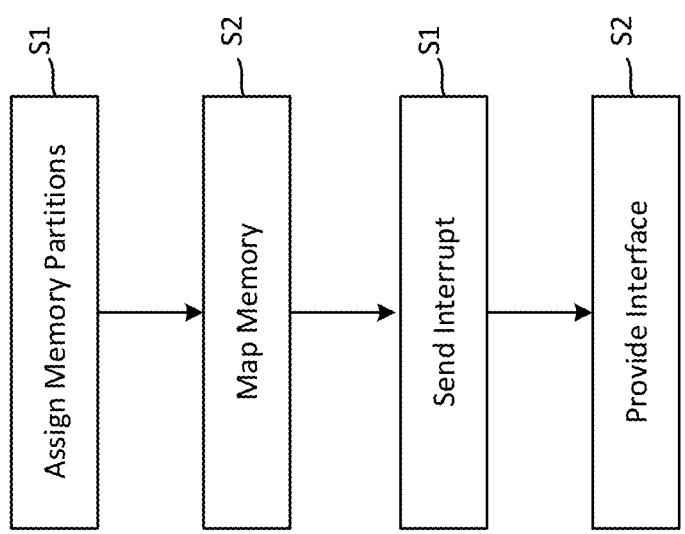
FIG. 3 shows is a flowchart diagram of a method for memory synchronization of a multi-core system according to one embodiment of the present disclosure.

In the associated figures, identical reference signs denote identical or at least equivalent elements, parts, units or steps. In addition, it should be noted that all of the accompanying drawings are not to scale.

The technical solutions in the embodiments of the present disclosure are described in the following text with detailed reference to the accompanying drawings in the embodiments of the present disclosure.

The described embodiments are only some embodiments of the present disclosure, rather than all embodiments. Based on the described embodiments of the present disclosure, all other embodiments obtained by persons of ordinary skill in the art without making any creative effort shall fall within the protection scope of the present disclosure.

FIG. 1 shows a schematic diagram of a system for memory synchronization of a multi-core system according to one embodiment of the present disclosure.

FIG. 1 shows an embodiment of a system 100 for memory synchronization of a multi-core system 1000, the system 100 comprising: an assigning module 10, a mapping module 20, and an interface module 30.

The assigning module 10 may be configured to assign at least one memory partition 200-1, . . . , 200-n to at least one core 1010-1, . . . , 1010-n of the multi-core system 1000.

The mapping module 20 may be configured to provide information for translation lookaside buffer shootdown for the multi-core system 1000 leveraged by sending an interrupt to the at least one core 1010-1, . . . , 1010-n of the multi-core system 1000, if a page table entry associated with the memory partition 200-1, . . . , 200-n assigned to the at least one core 1010-1, . . . , 1010-n is modified.

The mapping module 20 may provide the mapping information that will be used during TLB shootdown by the operating system kernel 3000, which performs the TLB shootdown.

The interface module 30 may be configured to provide an interface to the assigning module 10 from user-space.

FIG. 2 shows a schematic diagram of a database comprising a system for memory synchronization of a multi-core system according to an embodiment of the disclosure.

FIG. 2 shows a schematic diagram of a database 2000 comprising a multi-core system 1000 with at least one core 1010-1, . . . , 1010-n; a memory system 200 with at least one memory partition 200-1, . . . , 200-n; and a system 100 for memory synchronization of the multi-core system 1000.

The system 100 may comprise an assigning module 10, a mapping module 20, and an interface module 30.

FIG. 3 is a flowchart diagram of a method for memory synchronization of a multi-core system according to one embodiment of the present disclosure.

As a first step of the method, assigning S1 at least one memory partition 200-1, . . . , 200-n to at least one core 1010-1, . . . , 1010-n of the multi-core system 1000 using an assigning module 10 is conducted.

As a second step of the method, providing S2 a translation lookaside buffer shootdown for the multi-core system 1000 using a mapping module 20 is conducted.

As a third step of the method, sending S3 an interrupt to the at least one core 1010-1, . . . , 1010-n of the multi-core system 1000 is conducted, if a page table entry associated with the memory partition 200-1, . . . , 200-n assigned to the at least one core 1010-1, . . . , 1010-n is modified.

As a fourth step of the method, providing S4 an interface to the assigning module 10 to a user-space using an interface module 30 is conducted.

Figure 4:
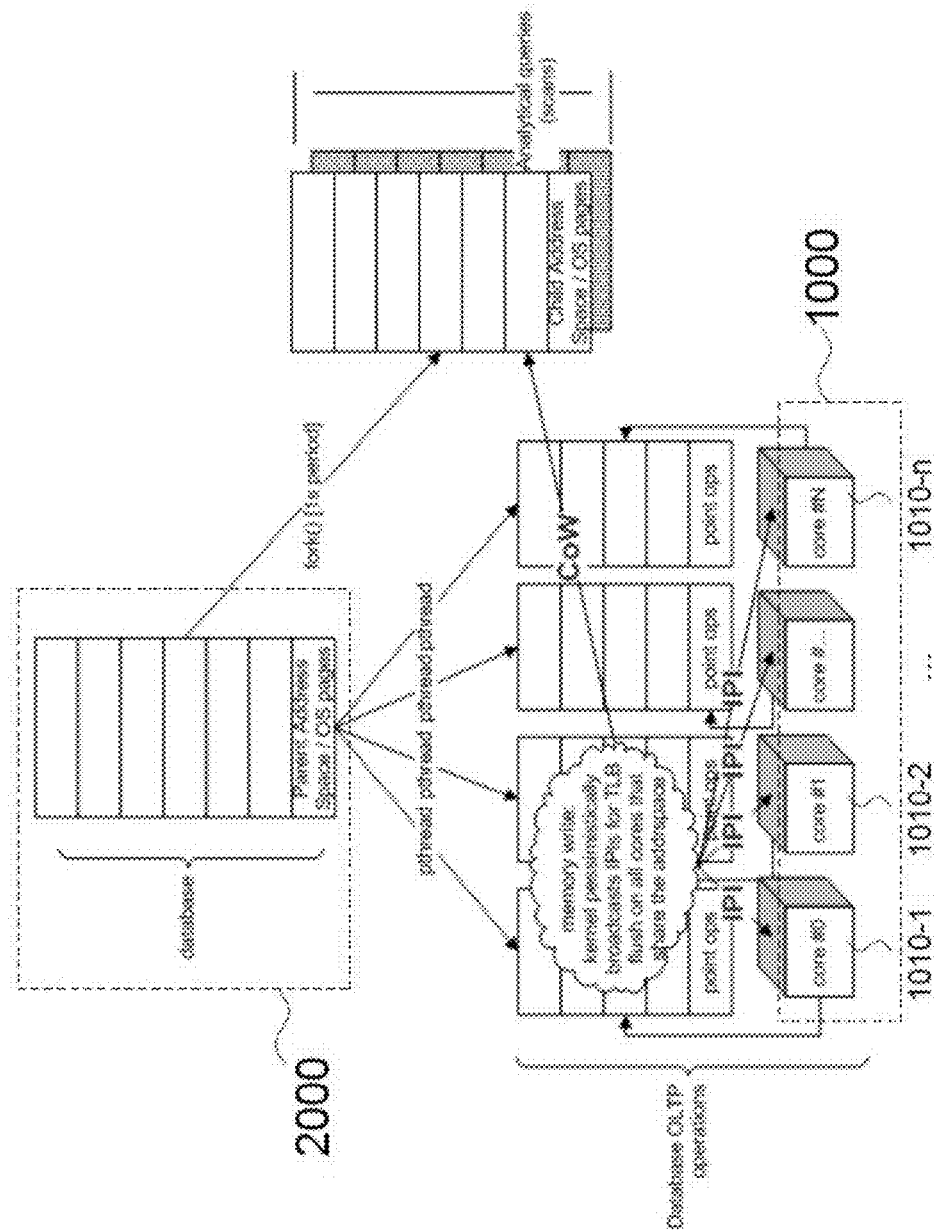
FIG. 4 is a diagram of an operating system kernel according to one embodiment of the present disclosure.

FIG. 4 is a diagram of an operating system kernel according to one embodiment of the present disclosure.

FIG. 4 shows the operating system kernel 3000 issues TLB shootdown IPIs towards all hardware processing cores that share the parent address space, when an OLTP operation attempts to update memory. This happens during CoW page-fault handling by the operating system, induced by an exception raised from the protection unit of the hardware MMU.

According to an embodiment of the present disclosure, the implementation may include modifications or enhancements to the operating system kernel 3000, in order to: expose the required interface to the user-space/database applications that control the binding of memory partitions to particular CPU cores, for the purposes of TLB shootdown (e.g. by introducing a set of new system calls to the operating system kernel).

A further advantage is provided by accordingly enhancing the related operating system kernel 3000 TLB shootdown functionality that is involved during page-fault time for copy-on-write pages, in order to consult the information that has been passed from the database 2000 to the operating system kernel 3000 via the new set of system calls.

In addition, the leverage the mechanism by the database 2000 is improved, by ensuring that every OLTP thread operates on one or more memory partitions, and by conveying this information to the kernel 3000 by means of the new system calls.

According to an embodiment of the present disclosure, on a scenario where a hybrid OLTP/OLAP in-memory database 2000 uses the MMU-based CoW snapshotting mechanism, the operating system kernel 3000 is necessarily broadcasting TLB shootdown requests via IPIs towards all of the hardware processing cores 1010-1, . . . , 1010-n that share the parent address space by means of threads, when an OLTP transaction attempts to update any part of the memory that is currently being snapshotted (during CoW page-fault handling) as shown in FIG. 4.

According to an embodiment of the present disclosure, a controlled dispatching of TLB shootdown IPIs may be installed, which is influenced by user space. The database/application is responsible for reducing the set of cores 1010-1, . . . , 1010-n that receive an IPI by periodically (or on-demand) providing a restricted CPU mask to the kernel by means of a set of newly introduced system calls.

According to an embodiment of the present disclosure, the CPU mask, is a data structure that indicates which CPU cores 1010-1, . . . , 1010-n of the multi-core system 1000 should be included, and which should be excluded by the binding. The kernel invalidation related functions are modified to leverage the provided CPU mask for selectively dispatching IPIs during CoW page-faults.

According to an embodiment of the present disclosure, the database 2000 or any application is further responsible for ensuring that its user space threads (doing OLTP transactions) respect the bindings that have been passed to the kernel 3000, by restricting their operation on a corresponding memory region and operating from the specific cores 1010-1, . . . , 1010-n that are bound to that region.

The system calls that control the TLB-invalidating IPIs operate by specifying a memory block identified by its starting virtual memory address, and by providing a CPU mask, identifying which cores 1010-1, . . . , 1010-n of the multi-core system 1000 should receive TLB shootdown IPIs when CoW page-fault occurs in the particular block of memory.

According to an embodiment of the present disclosure, the memory block is automatically inferred by the operating system (there is no need to provide an address-length pair from the perspective of the user space), since the operating system is internally keeping track of allocated regions, and can easily locate the containing memory block that the supplied virtual memory address belongs to.

For example, the following system calls can be introduced to an operating system kernel:
mem_region_set_cpumask(void*addr,
    cpumask_t*cpumask);
mem_region_get_cpumask(void*addr,
    cpumask_t*cpumask);

The internal implementation locates the containing memory region for the supplied virtual memory address (addr), by consulting some per-process kernel internal memory allocation book-keeping structure.

According to an embodiment of the present disclosure, the kernel internal structure that corresponds to an allocated memory block is also enhanced in order to store a CPU mask structure, as supplied from the system calls.

According to an embodiment of the present disclosure, the system calls, after locating the particular structure for the containing memory region, copy the CPU mask from user-space memory to kernel-space memory (or from kernel-space to user-space) for mem_region_set_cpumask (and mem_region_get_cpumask) respectively. In the case of mem_region_set_cpumask, the CPU mask is copied in the kernel space and stored in the structure that identifies the allocated memory block.

Figure 5:
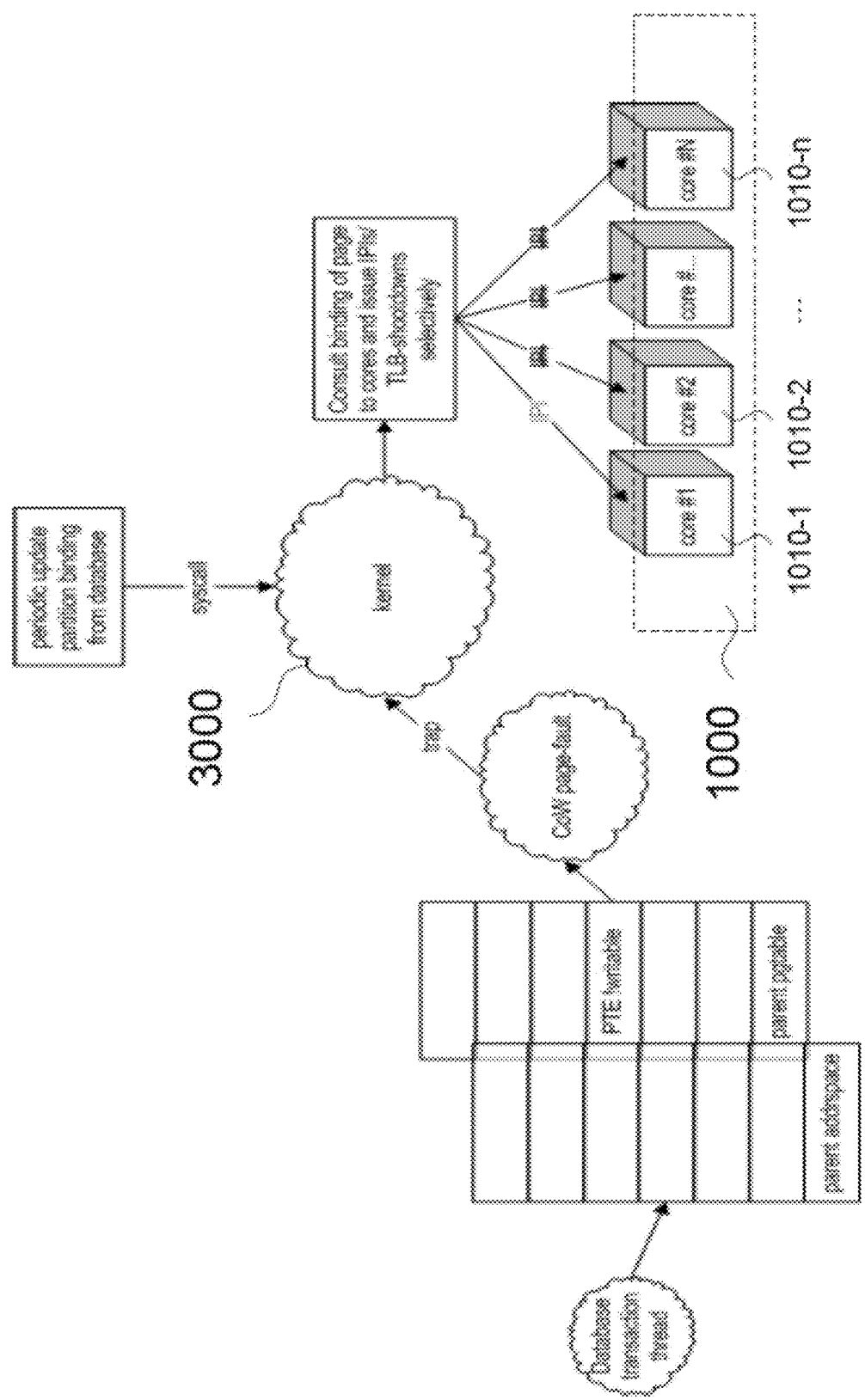
FIG. 5 shows a schematic diagram of a operating system kernel according to one embodiment of the present disclosure.

FIG. 5 shows a schematic diagram of an operating system kernel, during CoW page-fault handling according to one embodiment of the present disclosure.

FIG. 5 shows the operating system kernel 3000, during CoW page-fault handling, can leverage the binding information provided earlier by the database 2000 (via a set of new system calls), in order to issue TLB-shootdown IPIs selectively, instead of broadcasting them to every available core 1010-1, . . . , 1010-n that shares the address space.

According to an embodiment of the present disclosure, during handling a copy-on-write page fault, the kernel 3000 has enough information (the hardware exception handled is providing the faulting address) in order to locate the containing memory region, and obtain the CPU mask that is associated with that region.

According to an embodiment of the present disclosure, the kernel 3000 can subsequently use the CPU mask in order to selectively issue TLB shootdown IPIs, directed only towards the cores 1010-1, . . . , 1010-n that are indicated within the corresponding CPU mask, as shown in FIG. 5.

By default, if no CPU mask has been supplied by the database, the operating system kernel handles the TLB shootdown by broadcasting IPIs to all the cores 1010-1, . . . , 1010-n that share the address space, assuming that there is no information supplied by the user space/database that could be leveraged to narrow the set of cores 1010-1, . . . , 1010-n to receive TLB shootdowns during the CoW page fault.

According to an embodiment of the present disclosure, in case the application/database needs to revert back to the "default" operating system behavior after having supplied a CPU mask via the related system call, it can provide a "null" CPU mask in order to restore the default behavior.

This reference implementation is only serving for illustrative purposes. The same scheme could be implemented via a different kind of interfaces and semantics from the database/application to the operating system kernel 3000.

According to an embodiment of the present disclosure, the memory management related operating system kernel calls (e.g., mmap or a new system call), could be enhanced in order to accommodate a parameter that indicates the CPU mask (i.e. the binding of a memory region to a set of processing cores 1010-1, . . . , 1010-n).

Another example would be a modification and extension of existing operating system kernel calls (e.g., mmap), introducing a new flag (e.g. MAP_BIND) that would indicate implicitly that the memory region to be allocated by the call, should be bound to the CPU that the system call was invoked on (e.g. the CPU of the thread allocating the memory region), for the purposes of TLB shootdown IPIs.

The reference implementation though, offers more flexibility, since it allows for explicit binding of memory regions to processing cores 1010-1, . . . , 1010-n, and for modification of the bindings throughout the runtime of the database system 2000.

The present disclosure also supports a computer program product including computer executable code or computer executable instructions that, when executed, causes at least one computer to execute the performing and computing steps described herein.

Many alternatives, modifications, and variations will be apparent to those skilled in the art in light of the above teachings. Of course, those skilled in the art readily recognize that there are numerous applications of the disclosure beyond those described herein.

While the present disclosure has been described with reference to one or more particular embodiments, those skilled in the art recognize that many changes may be made thereto without departing from the scope of the present disclosure. It is therefore to be understood that within the scope of the appended claims and their equivalents, the disclosures may be practiced otherwise than as specifically described herein.

In the claims, the word "comprising" does not exclude other elements or steps, and the indefinite article "a" or "an" does not exclude a plurality. A single processor or other unit may fulfill the functions of several items recited in the claims.

The mere fact that certain measures are recited in mutually different dependent claims does not indicate that a combination of these measured cannot be used to advantage. A computer program may be stored or distributed on a suitable medium, such as an optical storage medium or a solid-state medium supplied together with or as part of other hardware, but may also be distributed in other forms, such as via the Internet or other wired or wireless telecommunication systems.

The invention claimed is:

1. A system for memory synchronization for a multi-core system comprising multiple cores, the system comprising:
   a memory, and a processor configured to execute instructions stored in the memory to:
      bind, via an interface, at least one memory partition to a particular core of the multiple cores;
      control the binding of the at least one memory partition to the particular core using a set of system calls; and
      send a translation lookaside buffer (TLB) shootdown request via an inter-processor interrupt (IPI) only to the particular core bound to the at least one memory partition when a page table entry associated with the at least one memory partition is modified.

2. The system according to claim 1, wherein the TLB shootdown request is sent during a copy-on-write page sharing of the at least one memory partition.

3. The system according to claim 1, wherein the processor uses the set of system calls to receive the TLB shootdown information.

4. A database, comprising
   a multi-core system with multiple cores;
   a memory system with multiple memory partitions; and
   a system for memory synchronization of the multi-core system, the system comprising a processor configured to execute instructions stored in a memory to:
      operate as an assigning module configured to bind, via an interface, at least one memory partition to a particular core of the multiple cores;
      operate as a mapping module configured to send a TLB shootdown request via an inter-processor interrupt (IPI) only to the particular core bound to the at least one memory partition when a page table entry associated with the at least one memory partition is modified; and
      operate as an interface module which is configured to control the binding of the at least one memory partition to the particular core using a set of system calls.

5. The database according to claim 4, wherein the database is a hybrid online transactional processing and online analytical processing database.

6. The database according to claim 5, wherein the database is configured to perform online transaction processing by ensuring that at least one online transactional processing thread operates on one or more of the at least one memory partition.

7. The database according to one of claim 4, wherein the database is enabled to provide a controlled dispatching of the TLB shootdown by using a data structure indicating which of the multiple cores is bound to which of the at least one memory partition.

8. The database according to claim 4, wherein the interface module is configured to adapt the TLB shootdown by information as received by using the set of system calls.

9. A method for memory synchronization for a multi-core system comprising multiple cores, the method comprising:

binding, via an interface, at least one memory partition to a particular core of the multiple cores;

sending a translation lookaside buffer (TLB) shootdown request via an inter-processor interrupt (IPI) only to the particular core bound to the at least one memory partition when a page table entry associated with the at least one memory partition is modified; and controlling the binding of the at least one memory partition to the particular core using a set of system calls.

10. The method according to claim 9, wherein the step of sending the TLB shootdown request is performed during a copy-on-write page sharing of the at least one memory partition.

11. The method according to claim 9, wherein the TLB shootdown information is received by using the set of system calls.

12. The method of claim 10 wherein program instructions that define the operations to be performed by a processor are stored in a non-transitory computer readable media.

* * * * *

UNITED STATES PATENT AND TRADEMARK OFFICE
CERTIFICATE OF CORRECTION

PATENT NO. : 10,452,686 B2
APPLICATION NO. : 15/669547
DATED : October 22, 2019
INVENTOR(S) : Iliopoulos et al.

It is certified that error appears in the above-identified patent and that said Letters Patent is hereby corrected as shown below:

In the Specification

In Column 3, Line 60, insert a -- . -- after "task" at the end of the line.

In Column 6, Line 37, delete "a" and insert -- an -- before "operating".

In the Claims

In Column 11, in Claim 7, Line 6, delete "one of" before the word "claim".

In Column 12, in Claim 12, Line 14, delete "of" after "method" and insert -- according to --, therefor.

Signed and Sealed this
Twentieth Day of December, 2022

Katherine Kelly Vidal
*Director of the United States Patent and Trademark Office*